United States Patent

[11] 3,624,507

[72] Inventors Masao Fukata
94, Shimorenjaka Mitaka-shi;
Shozo Takahashi, 95-4, Ohaza-Kumagawa
Fussa-cho, Nishtama-gun, both of Tokyo-to,
Japan

[21] Appl. No. 632,674
[22] Filed Apr. 21, 1967
[45] Patented Nov. 30, 1971

[54] COMMUNICATION SYSTEM OF A CUE SIGNAL OR SIGNALS
5 Claims, 22 Drawing Figs.

[52] U.S. Cl. .......... 325/45,
325/30, 325/35, 325/131, 340/168, 340/171
[51] Int. Cl. .......... H04l 27/10
[50] Field of Search .......... 343/228,
225, 226, 227; 325/31, 131, 32, 35, 63, 64, 131,
132, 45, 30; 340/207, 168, 170, 171

[56] References Cited

UNITED STATES PATENTS

| | | | |
|---|---|---|---|
| 3,493,865 | 2/1970 | Miller | 325/30 |
| 1,454,532 | 5/1923 | Beatty | 325/35 |
| 1,830,242 | 11/1931 | Ranger | 325/131 |
| 1,851,174 | 3/1932 | Hammond, Jr. | 325/35 |
| 2,422,664 | 6/1947 | Feldman | 325/35 |
| 2,448,055 | 8/1948 | Silver et al. | 325/35 |
| 2,666,198 | 1/1954 | Wallace | 325/131 |
| 2,938,202 | 5/1960 | Kirch et al. | 343/227 |
| 3,372,393 | 5/1968 | Cataldo | 343/225 |
| 3,379,976 | 4/1968 | Niedereder | 325/131 |
| 3,201,757 | 8/1965 | Himmel | 340/171 |

*Primary Examiner*—Benedict V. Safourek
*Attorneys*—Robert E. Burns and Emmanuel J. Lobato

ABSTRACT: Disclosed herein is a system for transmitting a cue signal or signals by use of at least one wobbled wave obtained by slightly wobbling a low-frequency sinusoidal wave, in an intermittent periodic manner, along a substantially sawtooth wave pattern the number of cycles of which is determined in accordance with the cue signal to be transmitted: in which the transmitted wobbled wave is applied to a narrow passband filter and changed into a pulse train the number of pulses of which is equal to the number of cycles of the sawtooth wave pattern, wherein the pulses have a constant period irrespective of slight deviation of the wobbling frequency range and/or slight deviation of the center frequency of the narrow passband filter; and, in which the transmitted cue signal is detected by counting the number of pulses of the pulse train in consideration of the constant period of pulses.

COMMUNICATION SYSTEM OF A CUE SIGNAL OR SIGNALS

This invention relates to a communication system for a cue signal or signals.

In conventional cue signal transmission system using at least one carrier wave of constant frequency or at least one modulated carrier wave, the transmitted wave or waves is/are generally detected through a selection filter or filters of narrow pass-band at the receiving side since the transmission wave or waves is/are liable to be disturbed in the transmission medium by interference waves or noises. In this case, it is desirable that the bandwidth of the selection filter is made as narrow as possible to prevent such disturbances. However, if the selection filter is designed so as to have a very narrow pass-band to receive a transmitted wave, it is necessary that the transmitted wave have an extremely high stability of frequency and the center frequency of the selection filter in the receiver has to precisely coincide with the frequency of the transmitted wave. Moreover, if the transmitted wave is received at a plurality of receiving stations, the transmitted wave cannot be detected reliably unless selection filters of all the receiving stations have narrow-frequency bandwidths which are equivalent to one another and suitable to detect the transmitted wave. In an actual case, however, it is very difficult to sufficiently meet such requirements.

To resolve such disadvantages of the conventional system, the inventors of this invention previously disclosed a cue signal communication system capable of reliably transmitting at least one cue signal as described in U.S. Pat. No. 3,530,472, issued Sept. 22, 1970. At the sending side of the previously disclosed system, a low-frequency wave is slightly wobbled in accordance with a continuous sawtooth wave pattern to transmit, by use of a carrier wave, the wobbled wave to the receiving side. The receiving side of the wobbled wave is provided with a band-pass filter having a pass-band considerably narrower than the wobbled bandwidth. The wobbled wave is applied to the narrow band-pass filter, so that a pulse is derived per each wobbled period from the wobbled wave. The cue signal is therefore detected in consideration of a condition where the period and the number of the derived pulses correspond to those of the continuous sawtooth wave pattern of the sending side.

In the previously disclosed system, transmission of the cue signal can be reliably carried out without spurious triggering if the narrow-band pass filter has desirable characteristics as to its frequency selectivity, such as bandwidth and attenuation slope. In this case, the desirable frequency selectivity of the narrow band-pass filter has a bandwidth of approximately ±1 cycle in the case of the wobbled bandwidth of ±5 cycles.

However, an actual filter having such frequency selectivity is generally expensive, so that the price of the receiving device is uneconomical. If there are a number of receiving stations for which the receiving apparatus is to be provided at a relatively low price, then it is desirable that the cue signal be transmitted without spurious triggering even if the narrow band-pass filter does not have such a desirable frequency selectivity.

Thus, an object of this invention is to provide an improved communication system for a cue signal or signals of the type described in which the cue signals can be reliably transmitted even if an inexpensive selection filter is employed in the receiving side.

Said object and other objects of this invention can be attained by the system of this invention for transmitting a cue signal or signals, comprising a generator for generating a wobbled wave by slightly wobbling a low-frequency sinusoidal wave, in an intermittent periodic manner, in accordance with a substantially sawtooth wave pattern the number of cycles of which is determined in accordance with the cue signal to be transmitted; transmitter means for transmitting the wobbled wave into a transmission medium; receiver means for receiving the transmitted wobbled wave from the transmission medium; a filter coupled with the receiver means and having a narrow pass-band narrower than the wobbling frequency deviation of the transmitted wobbled wave, thereby producing a pulse train the period of pulses of which is substantially the same as that of the wobbled duration of the transmitted wobbled wave and the number of pulses of which corresponds to the number of cycles of the wobbled duration; and detection means for determining the transmitted cue signal corresponding to the pulse train in consideration of the periodic characteristic of the pulse train.

The novel features of this invention are set forth with particularity in the appended claims, however this invention, as to its construction and operation together with other objects and advantages thereof, may best be understood by reference to the following description, taken in connection with the accompanying drawings, in which the same parts are designated by the same characters, numerals and symbols as to one another, and in which:

Figure 8:
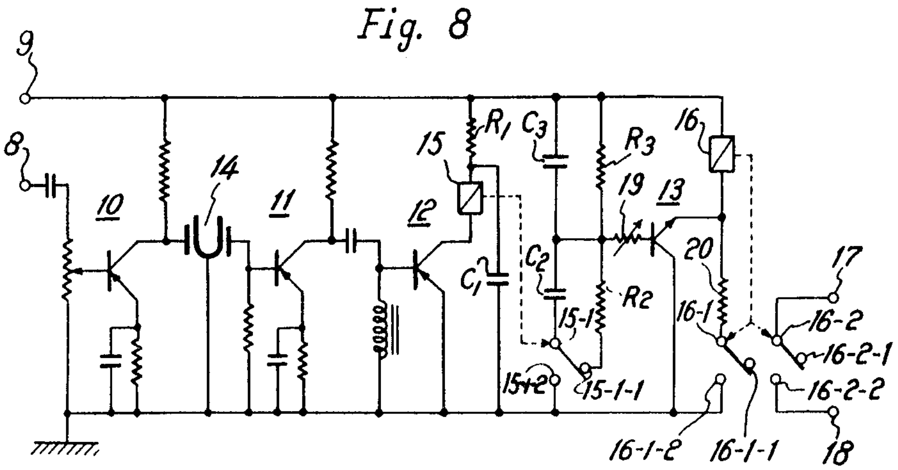
Figure 9A:
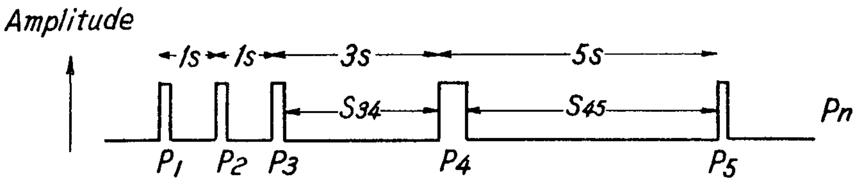
Figure 9B:
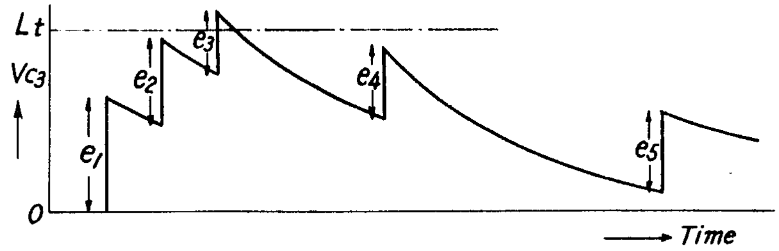

FIGS. 5, 6, 6C, 7A, 7B, 7C, and 7D are waveform diagrams illustrating the wobbling operation of the sending side of the system according to this invention;

FIG. 8 is a schematic diagram illustrating an example of a filter and a detector to be employed at the receiving side of the system according to this invention; and FIGS. 9A and 9B are wave form diagrams illustrating the principles of operation of the circuitry illustrated in FIG. 8.

Figure 1A:
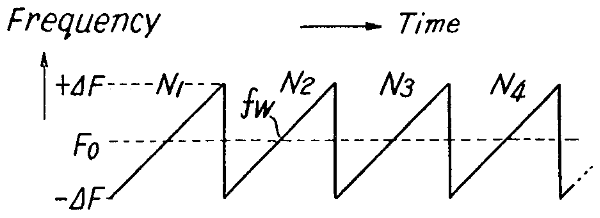
FIGS. 1A, 1C and 1D are waveform diagrams illustrating principles of operation of a system of the type of this invention.
Figure 1B:
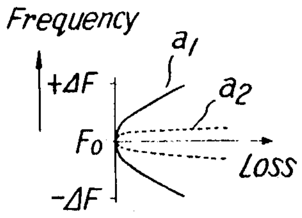
FIG. 1B shows characteristic curves for use in describing the nature of operation of a system of the type of this invention.
Figure 1C:
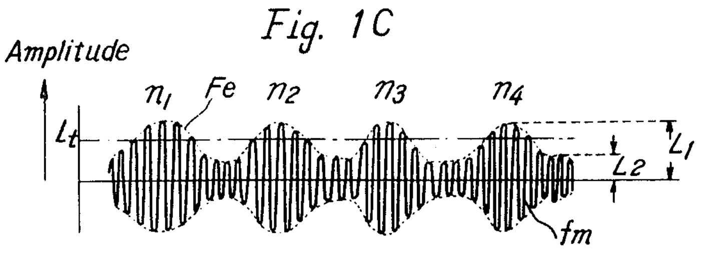
Figure 1D:
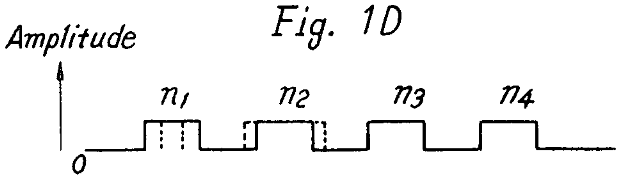

To clarify he nature of this invention, the operation of a system of the type described, in which a transmitted wave pattern wobbled along a continuous sawtooth wave is applied to a narrow pass-band filter having gentle attenuation slopes, will first be described. FIG. 1A shows the frequency deviation of the wobbled wave in accordance with a continuous sawtooth wave, the wobbled wave having a center frequency $F_0$ and $H_z$ and a wobbled frequency deviation of $\pm\Delta FH_z$. If the wobbled wave *fw* is sent to a receiving side and applied to a narrow band-pass filter having a relatively small attenuation rate shown by a heavy line $a_1$ in FIG. 1B, while a desirable attenuation slope is shown by a dotted line $a_2$, a signal *fm* amplitude modulated as is shown in FIG. 1C is derived from the narrow band-pass filter. In this waveform *fm*, the fluctuation of the maximum instantaneous level is caused by the transient due to the narrow band-pass characteristic of the filter, and the fluctuation of the minimum instantaneous level is caused by the above-mentioned transient and the return of the wobbling sawtooth wave. Accordingly, if the signal *fm* is rectified so as to produce an envelope signal F*e*, and if the level detection of the envelope signal F*s* is then carried out by an appropriate threshold level L*t* which is an intermediate level between the maximum level $L_1$ and the minimum level $L_2$ then pulses $n_1$ $n_2$ $n_3$ are obtained in response to the respective cycles $N_1$ $N_2$ $N_3$ of the wobbled wave of the sending side.

However, the above operation is without consideration of noise and level fluctuation in the transmission medium. If the noise in the transmission medium are under consideration in a case where the wobbled wave is transmitted by use of amplitude modulation of a carrier wave, the transmitted wobbled wave received at each receiver has generally a considerable amount of level fluctuation. In this case, therefore, the level detection of the envelope signal F*e* cannot be correctly carried out, since there are undesirable phenomena, such as deviations of the durations of pulses, omissions of some of the pulses and undistinctness between adjacent pulses.

Moreover, since the noises of the transmission medium are superposed on the pulses, the above-mentioned undesirable phenomena become more complex so that is it very difficult to correctly detect the transmitted cue signal even if the transmitted cue signal is to be detected with respect to the constant period of the derived pulses.

In addition to such difficulty, if a number of receiving stations are established to receive a cue signal or signals, a predetermined threshold level common to all the receiving stations cannot be used for the derived pulsive signals shown in FIG. 1C since the levels of the derived pulsive signals are different from one another for the respective receiving stations.

The cue signal communication system of this invention is capable of transmitting cue signals or signal in a highly reliable, manner, even though the transmission medium and the selection filter define such undesirable conditions.

Figures 2A, 2B, 2C, 2D, 2E:
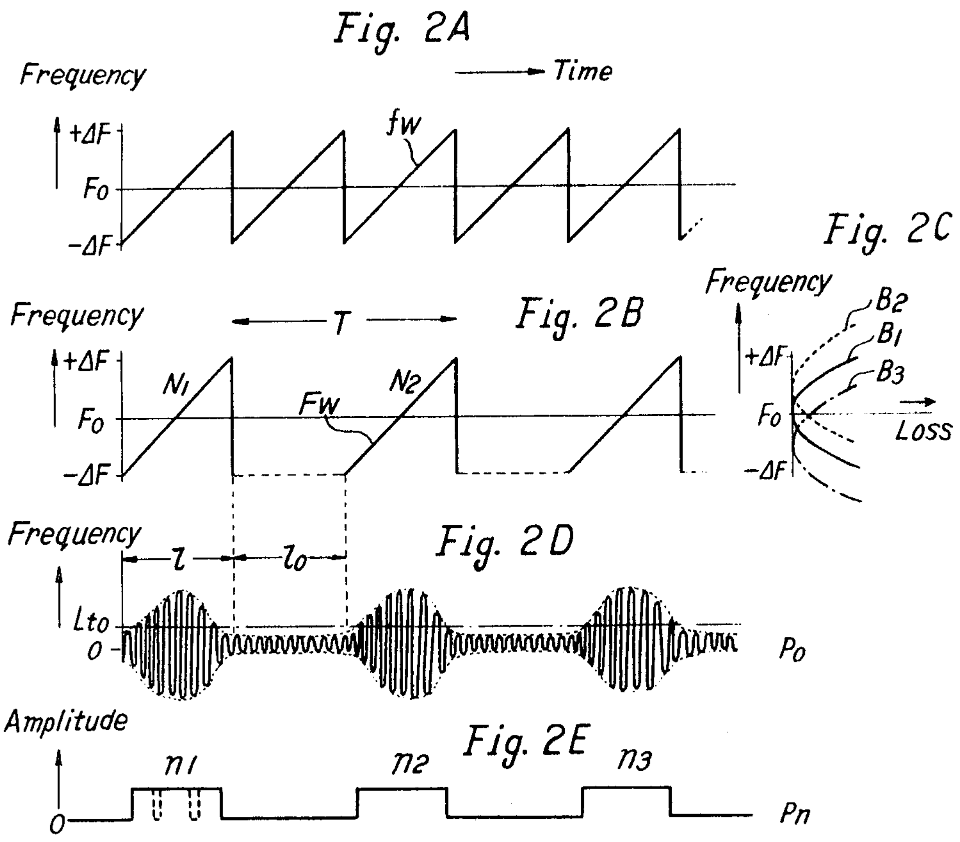
FIGS. 2A, 2B, 2D and 2E are waveform diagrams illustrating principles of operation of the system of this invention.
FIG. 2C shows characteristic curves for use in describing the operation principles of the system of this invention.

With reference to FIG. 2A, 2B, 2C, 2D, and 2E, the operation principle of this invention will now be described. At the sending side, a low-frequency signal is wobbled, in a periodic intermittent manner as is shown in FIG. 2B so as to produce a wobbled wave $Fw$. In the FIG. 2B, the wobbling period $\tau$ and the pause period $\tau_o$ are in synchronism with the continuous sawtooth wave shown in FIG. 2A.

However, it is not always essential that the periods $\tau$ and $\tau_o$ are completely synchronized with the period of the continuous sawtooth wave. That is, if the wobbled wave $Fw$ is applied to a selection filter having a frequency characteristic $B_1$ shown in FIG. 2C, a pulse signal shown in FIG. 2D will be derived from the selection filter. As is clearly understood from a comparison of the wobbled waves shown respectively in FIGS. 1B and 2B, the derived pulse signal $P_0$ has a constant low-level valve which lasts until the succeeding pulsive signal, which is, and substantially free of disturbances of noises or of interference waves as is shown in FIG. 2D. The derived pulse signal $P_o$ is rectified so as to produce an envelope signal $Fe$. Since respective pulse signals of this envelope signal $Fe$ depart clearly from one another at respective spacings of the constant low level, the level detection of the pulse signals as to the envelope signal $Fe$. can be correctly carried out even though a considerably amount of level fluctuation is included in the envelope signal $Fe$ Accordingly, pulses $n_1$ $n_2$ $n_{3,}$ ... can be correctly detected in response to the respective wobbled periods, $N_1$, $N_2$ $N_3$ .... of the transmitted wobbled wave $Fw$ as are shown by a pulse train $Pn$ in FIG. 2E.

Even if the frequency characteristic $B_1$ is slightly deviated as is shown by a curve $B_2$ or $B_3$ of FIG. 2C, the period T of the pulses $n_1$ $n_2$ $n_3$ ... of the detected pulse train $Pn$ is substantially constant in accordance with the constant period T of the intermittent wobbling sawtooth wave $Fw$. It is for this reason that the frequency deviation during the respective wobbled periods $\tau$ is carried out in the unidirectional manner as is similarly disclosed in the above-mentioned patent.

Moreover, since the noise of the transmission medium is superposed only on the pulsive signals lasting over the wobbled periods $\tau$ and not superposed during the pause period $\tau_o$, it is unusual for the output pulse to be disturbed with the noise of the transmission medium. In a rare case, any one of the pulses $n_1$, i $n_2$, $n_3$, ... may have splits in it. However, even if there are splits in any of the pulses $n_1$, $n_2$, $n_3$, ... the information represented by the pulse train $Pn$ can be correctly detected if a detector operably under consideration of the constant period of the pulses $n_1$, $n_2$, $n_3$, ... is employed. In an actual case, the pulses $n_1$, $n_2$, $n_3$, ... have not always had an exactly constant period, but they can be detected without error by use of the detection circuit described hereafter. Accordingly, it is not essential in the strict sense of the word to meet the requirement of precise homogeneity as to the period of the pulses $n_1$, $n_2$, $n_3$, ... .

As will be understood from the above-mentioned principle, only the unidirectional, intermittent and periodic wobbling is essential in the system of this invention. Under the said nature of this invention, the intervals of the wobbled periods $\tau$ may be selected in an appropriate duration as will be described below with respect to actual examples.

In addition to interruptions of the wobbling as is mentioned above, more reliable operations can be carried out by transmitting only the wobbled wave during the wobbled period $\tau$ and by spacing, for an appropriate time (e.g., $\tau_o$), the sending of the wobbled wave $Fw$as is shown by dotted lines in FIG. 2B. This principle will be described more particularly with reference to the actual example. Moreover, if the instantaneous frequency of the wobbled wave is shifted to the outside of the passband of the receiving selection filter, similar operations will be expected.

Figure 3A:
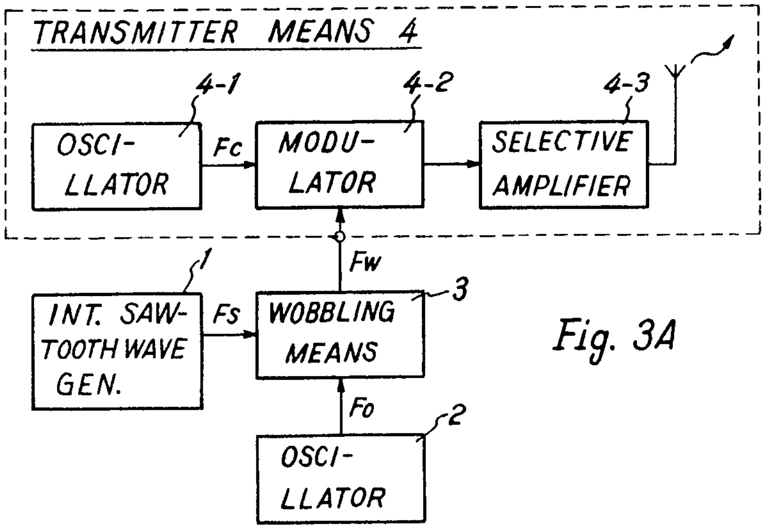
FIGS. 3A, 3B and 3C are block diagrams illustrating examples of the sending side of the system of this invention.
Figure 4:
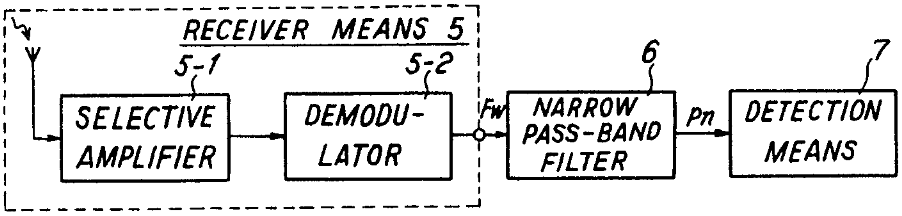
FIG. 4 is a block diagram illustrating an example of the receiving side of the system of this invention.

Referring to FIGS. 3A and 4, embodiment of the system of this invention applied to radio communication will now be described. The transmitter side of the system comprises, as is shown in FIG. 3A, generator 1 of intermittent sawtooth wave $Fs$, wobbling means 3, an oscillator 2 and transmitter means 4. The oscillator 2 generates a low frequency (e.g. audio frequency) sinusoidal wave $F_o$. The wobbling means 3 is employed for slightly wobbling, in accordance with a cue signal to be transmitted, an instantaneous frequency of the low-frequency wave $F_o$ in accordance with the intermittent wave $Fs$. Accordingly, a generator composed of the oscillator 2, the generator 1 and the wobbling means 3 produces a wobbled wave $Fw$, which is wobbled from a frequency ($F_o$—$\Delta fw$) to a frequency ($F_o$+$\Delta fw$) in accordance with the intermittent sawtooth wave $Fs$ as is shown in FIG. 2B. By way of example, the frequency $fw$ and the wobbling frequency ($\pm\Delta fw$) are equal to 1,900 Hz. and ±5 Hz. respectively; and the period $\tau$ of the sawtooth wave is approximately equal to 1 second. The wobbled wave $Fw$ is applied to the transmitter means 4, which is composed of an oscillator 4–1, a modulator 4-2 and a selective amplifier 4–3 by way of example. The oscillator 4–1 generates a carrier wave $Fc$ having a constant radio frequency, and the carrier wave $Fc$ is modulated in the modulator 4–2 by use of the wobbled wave $Fw$. In this case, frequency modulation or amplitude modulation can be employed for transmitting the wobbled wave $Fw$. The modulated output wave of the modulator 4–2 is applied to the selective amplifier 4–3 which amplifies the modulated wave to emit it into a transmission medium (space) through an antenna.

The receiver side of the system comprises, as is shown in FIG. 4, receiver means 5, a narrow passband filter 6 and detection means 7. The receiver means 5 is composed of a selective amplifier 5–1 and a demodulator 5–2. The selective amplifier 5–1 receives, through a receiving antenna, the modulated wave transmitted from the sending side and selectively amplifies the received wave. This selective amplifier 5-1 is usually a receiver of superheterodyne type which is composed of at least one high-frequency stage and at least one intermediate-frequency stage. Automatic gain control can be adopted in this selective 5–1 since the transmitted wave is substantially a sequence signal. The amplified wave is applied to the demodulator 5–2, which is a detector or a frequency discriminator depending on the modulation type of the modulated wave transmitted. If the transmitted wave is a frequency-modulated wave, it is desirable that an amplitude limiter be inserted at the end of the selective amplifier 5–1. In this demodulator 5–2, the transmitted modulated wave is demodulated so as to produce the wobbled wave $Fw$. The narrow passband filter 6 coupled with the receiver means 5 has a bandwidth (±ΔFM considerably narrower than the wobbling deviation ($\pm\Delta fw$) of the transmitted wobbled wave $Fw$. It is desirable that the center frequency of the filter 6 is equal to the center frequency $F_o$ of the wobbling deviation ($F_o\pm\Delta fw$). However, it is allowable that the center frequency of the filter 6 have a slight amount of deviation if it is included in the wobbling deviation ($F_o\pm\Delta fw$). The filter 6 is, for example, a mechanical filter which has a center frequency 1,900 Hz. and bandwidth ±1 Hz. to correspond with the above-mentioned wobbled wave (1,900±5) Hz.

Another example of the sending side of the system will now be described with reference to FIGS. 3B, 3C, 2A, 2B, and 2B. In this example, a sawtooth wave generator 1*a* produces a continuous sawtooth wave as is shown in FIG. 2A, which wobbles the frequency of the sinusoidal wave $F_o$ derived from the low-frequency oscillator 2 in the wobbling means 3 so as to produce a continuously wobbled wave *fw* (as is shown in FIG. 1A). The intermittent sawtooth wave shown in FIG. 2B or described below, of course, may be applied to the wobbling means 3 to wobble the frequency of the sinusoidal wave. The sawtooth wave generator 1*a* generates a gating pulse signal G*s* which is synchronized with the intermittent wobbled periods $\tau$, and a synchronous gate circuit 1*b* passes the wobbled wave *fw* therethrough in synchronism with the gating pulse signal G*s*. In other word, the wobbled wave *fw* is inhibited during respective periods $\tau_o$ shown by dotted line in FIG. 2B and passed only during the remaining periods $\tau$. As the result of such formation, the gate circuit 1*b* generates a keyed-wobbled wave F*w* shown in FIG. 2B.

Figure 3B:
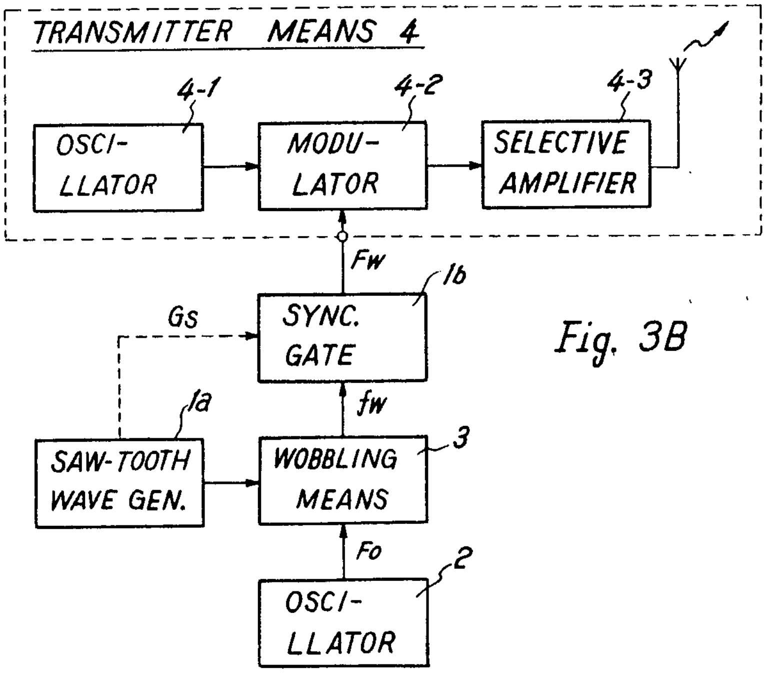
Figure 3C:
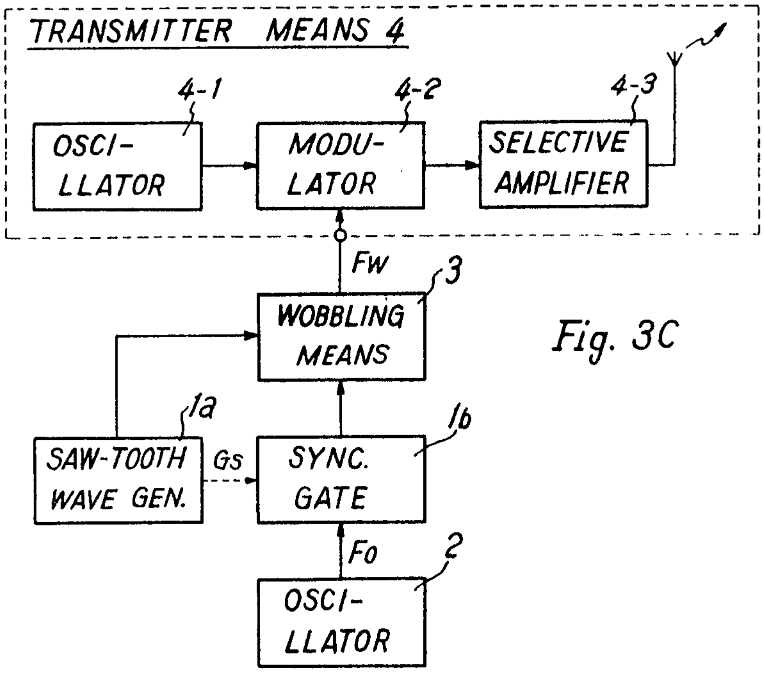

The synchronous gate circuit 1*b* can be arranged between the sinusoidal wave oscillator 2 and the wobbling means 3 as is shown in FIG. 3C to produce such a wobbled wave F*w*.

The gating pulse signal G*s* can be generated in synchronism with the respective returns of the sawtooth wave shown in FIG. 2A. (See FIG. 70).

Figure 5:
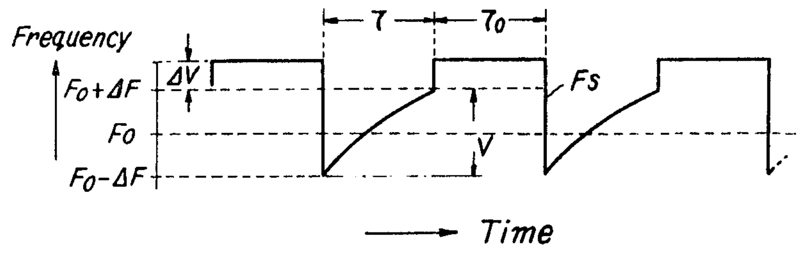

In the above-mentioned example shown in FIG. 3A, the intermittent sawtooth wave generator 1 can be formed by use of an astable multivibrator of conventional type. In this case, the outputs F*s* at the multivibrator's control-electrode is similar to the intermittent sawtooth wave as is shown in FIG. 5. This output voltage F*s* is not exactly a sawtooth wave, but its instantaneous level changes unidirectionally and periodically as does the intermittent sawtooth wave. Accordingly, if the voltage F*s* is applied to the wobbling means 3 so as to wobble the frequency of the sinusoidal wave $F_o$, in the period from the frequency ($F_o$−ΔF) to the frequency (F+ΔF), periods $\tau$ and $\tau_o$ of the output voltages F*s* can be employed as the wobbled period and the pause period respectively. Moreover, since the voltage F*s* is deviated, by a certain amount ΔV, from a voltage range V of sawtooth wave pattern in respective periods $\tau$, the instantaneous frequency of the wobbled wave F*w* will be shifted to the outside of the passband of the selection filter 6.

Figure 6:
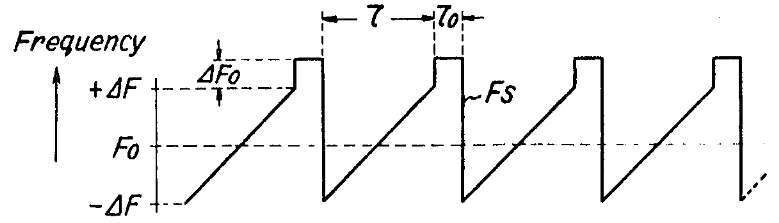

FIG. 6 shows another example of the intermittent sawtooth wave F*s* which will be generated from a blocking oscillator of conventional type. In such an example, the pause period $\tau_o$ is not equal to the wobbling period $\tau$. However, since the instantaneous level of the intermittent sawtooth wave F*s* changes unidirectionally and periodically, this sawtooth wave F*s* shown in FIG. 6 can be also employed for applying the wobbling means 3 of FIG. 3A.

Figures 7A, 7B, 7C, 7D:
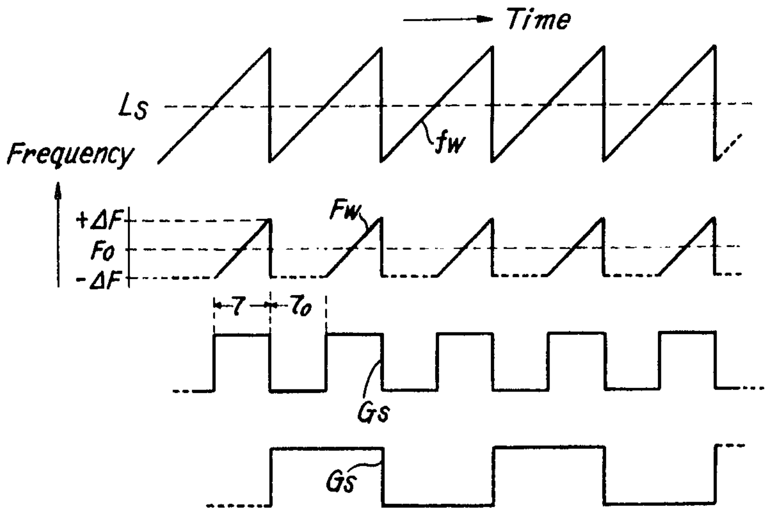

With reference to FIGS. 7A, 7B and 7C, the actual operation of the circuitries shown in FIGS. 3B and 3C will now be described. FIG. 7A shows a waveform pattern *fm* generated in the sawtooth wave generator 1*a*. If a gating signal G*s* shown in FIG. 7C is applied to the synchronous gate circuit 1*b*, a wobbled wave F*w* shown in FIG. 7B will be obtained while a wobbled wave F*w* shown in FIG. 2B will be obtained against a gating signal G*s* shown in FIG. 7D. The intermittent sawtooth wave F*w* shown in FIG. 7B corresponds to a waveform which is cut off, at a level $L_s$, with respect to the continuous sawtooth wave *fw* shown in FIG. 7A.

With reference to FIGS. 8, 9A and 9B, an actual example of the narrow passband filter 6 and the detection means 7 will be described. In FIG. 8, a terminal 8 is an input terminal to receive the demodulated wave F*w*, and a terminal 9 is a source terminal for supplying DC electric power to transistors 10, 11, 12 and 13. The demodulated wave F*w* applied to the terminal 8 is amplified at the transistor 10 and applied to a mechanical filter 14, which may have a narrow passband shown in FIG. 2C. However, if the filter 14 has a narrow passband shown by dotted line in FIG. 1B, more reliable operation will be obtained. The wave *fw* passes through the filter 14 and is converted into a pulse train (shown in FIG, 2D) which is amplified at the transistor 11 and applied to the transistor 12 which is employed as a rectifier. A relay 15 operates at each pulse of the pulse train P*n*. In this case, if a time constant determined by values ($r_1$ and $c_1$) of a resistor R1 and a capacitor C1 is appropriately adjusted, the relay 15 will be operated in response only to pulses having a power substantially larger than a predetermined power which is defined by a constant duration and a constant voltage. A contact 15–1 switches to a contact 15–1–2 from a contact 15–1–1 at each operation of the relay 15. The succeeding operations will be described with reference to FIG. 9A and 9B.

A pulse train shown in FIG. 9A is an example of the pulse train P*n* to be applied to the relay 15. In the pulse train P*n*, spaces between pulses P1 and P2 and between pulses P2 and P3 last respectively 1 second, and spaces between pulses P3 and P4 and spaces between P4 and P5 last respectively 3 seconds and 5 seconds. A capacitor C2 is charged up at respective receiving time of these pulses P1, P2, P3 ..., while the contact 15–1 is restored in response to the termination of the respective pulses P1, P2, P3 ... and the charged voltage of the capacitor C2 is discharged through a resistor R2 at each restoration of the relay 15–1. The time constant determined by values of the resistor R2 and the capacitor C2 is relatively small. In this case, if a capacitor C3 is connected in series with the capacitor C2 in a path between the source terminal 9 and ground, and if the time constant $c_3\,r_3$ of the resistor R3 and the capacitor C3 is determined at a value (e.g. about 5 seconds) which is considerably larger than the time constant $c2\,r_2$ of the resistor R2 and the capacitor C2, the voltage $V_{c3}$ across the capacitor C3 will be changed as is shown in FIG. 9B in response to respective pulses P1, P2, P3, ... shown in FIG. 9A. The voltage $V_{c3}$ increases by a large amount $e_1$, in response to the first pulse P1, and by relatively smaller amounts $e_2$, $e_3$, $e_4$ and $e_5$ in response to each of the succeeding pulse P2 and P3 .... Since the voltage $V_{c3}$ decreases gradually until application of the just succeeding pulse, the voltage V3 will be increased only when the pulses are obtained at a period considerably shorter than the time constant $c_3\,r_3$. In other words, the pulses P4 and P5 are not able to increase the voltage $V_{c3}$ in comparison with the voltage $V_{c3}$ at the pulse P3 since the spaces S34 and S45 last respectively for a time period approximately equal to the time constant $c_3\,r_3$.

As mentioned above, only when pulses P1, P2, P3 ... selected by the time constant $c_1r_1$ are obtained within a period considerably smaller than the time constant $c_3r_3$, and the number thereof exceeds a predetermined number (e.g.; three or five etc.), will the voltage $V_{c3}$ exceed a predetermined level $L_t$ as shown in FIG. 9B by way of example. Accordingly, if a relay circuit is formed by the transistor 13 and a relay 16 is designed so as to have an operation level corresponding to the level $L_t$, the relay 16 will be operated only when the above-mentioned condition is satisfied. A circuit composed of a resistance 20 and contacts 16–1, 16–1–1 and 16–1–2 is a self-hold circuit for the relay 16. By use of contacts 16–2 and 16–2–2 external circuitries can be introduced respectively to terminals 17 and 18.

If the terminals 17 and 18 are respectively connected to the output of the demodulator and the input of the low-frequency stage in a radio receiver as disclosed in the above-mentioned patent, and if the cue signal is covered by the frequency band of the radio receiver, it is possible that the radio receiver can be automatically unmuted at a time when the cue signal is transmitted to the radio receiver. Moreover, if the terminals 17 and 18 are introduced to a television receiver so as to actuate it in response to connection between the terminals 17 and 18, the cue signal transmitted through a radio channel will automatically actuate the television receiver to commence operation.

The cue signal communication system is able to transmit a plurality of cue signals as well as the single cue signal if the number of pulses or/and spaces between adjacent pulses is/are changed in accordance with the respective cue signals. In addition to the above modifications, a plurality of cue signals can be transmitted by use of combinations of a plurality of channels of such cue signals.

What we claim is:

1. A system for transmitting cue signals, comprising: generator means for generating a wobbled wave by intermittently wobbling the frequency of a low-frequency sinusoidal wave in accordance with a substantially sawtooth wave pattern the number of cycles of which is determined in accordance with the cue signal to be transmitted; modulator means connected to said generator means for modulating a carrier wave with said intermittent wobbled wave; transmitter means connected to said modulator means for transmitting said modulated carrier wave into a transmission medium; receiver means for receiving said modulated carrier wave from the transmission medium to detect the wobbled wave; a filter means coupled to the receiver means and having a passband narrower than the wobbling frequency deviation of said wobbled wave for developing a pulse train whose pulse period is substantially the same as that of said intermittent wobbled wave and having a number of pulses corresponding to the number of cycles of said sawtooth pattern; and detection means coupled to said filter means for detecting the cue signal from the periodic characteristic of the pulses of the pulse train.

2. A system as set forth in claim 1, in which the generator means comprises a sinusoidal wave oscillator for generating a sinusoidal wave, an intermittent sawtooth wave generator for generating intermittently and periodically cycles of a sawtooth wave, and wobbling means coupled with the sinusoidal wave oscillator and the intermittent sawtooth wave generator for wobbling the sinusoidal wave along the intermittent sawtooth wave to produce an intermittent wobbled wave.

3. A system as set forth in claim 2, in which the intermittent sawtooth wave generator comprises means for shifting the instantaneous frequency of the intermittent wobbled wave to the outside of the passband of said filter means.

4. A system as set forth in claim 1, in which the generator means comprises a sinusoidal wave oscillator, a sawtooth wave generator for generating a sawtooth wave and a gate signal synchronized with the sawtooth wave, wobbling means coupled to the sinusoidal wave oscillator and the sawtooth wave generator for wobbling the sinusoidal wave from the sinusoidal wave oscillator along the sawtooth wave generated from the sawtooth wave generator to produce the wobbled wave, and gating means connected to the wobbling means for synchronously gating the wobbled wave with said gating signal, thereby generating the intermittent wobbled wave.

5. A system as set forth in claim 1, in which the generator means comprises a sinusoidal wave oscillator, a sawtooth wave generator for generating a sawtooth and a gate signal synchronized with the sawtooth wave, gating means coupled to the sinusoidal wave oscillator and the sawtooth wave generator for gating a sinusoidal wave derived from the sinusoidal wave oscillator to produce a gated sinusoidal wave, and wobbling means coupled to the gating means and the sawtooth wave generator for wobbling the gated sinusoidal wave along the sawtooth wave, thereby generating the intermittent wobbled wave.

* * * * *